(12) United States Patent
Perez et al.

(10) Patent No.: US 6,714,127 B2
(45) Date of Patent: Mar. 30, 2004

(54) EMERGENCY WARNING SYSTEM FOR VEHICLES

(76) Inventors: Luis A. Perez, 48 Glenbrook Rd., Morris Plains, NJ (US) 07950; Brian S. Corzilius, 26803 Oak Knoll Ter., Cloverdale, CA (US) 95425

( * ) Notice: Subject to any disclaimer, the term of this patent is extended or adjusted under 35 U.S.C. 154(b) by 60 days.

(21) Appl. No.: 10/115,788

(22) Filed: Apr. 4, 2002

(65) Prior Publication Data

US 2003/0201884 A1 Oct. 30, 2003

(51) Int. Cl.[7] ............... B60Q 1/44; B60Q 1/50; G08G 1/16; G06G 7/78
(52) U.S. Cl. ............ 340/467; 340/436; 340/479; 340/902; 340/903; 701/301
(58) Field of Search ............... 340/436, 467, 340/479, 902, 903; 342/357.1; 701/301

(56) References Cited

U.S. PATENT DOCUMENTS

| | | | |
|---|---|---|---|
| 3,846,749 A | 11/1974 | Curry | |
| 4,357,594 A | 11/1982 | Ehrlich et al. | |
| 5,059,947 A | 10/1991 | Chen | |
| 5,111,181 A | 5/1992 | Priesemuth | |
| 5,148,147 A | 9/1992 | Kobres | |
| 5,220,307 A | 6/1993 | May et al. | |
| 5,289,182 A | * 2/1994 | Brillard et al. | 340/902 |
| 5,309,141 A | 5/1994 | Mason et al. | |
| 5,459,449 A | 10/1995 | Ravas, Jr. et al. | |
| 5,717,377 A | 2/1998 | Gao | |
| 5,736,926 A | 4/1998 | Winholtz | |
| 5,801,624 A | 9/1998 | Tilly et al. | |
| 5,821,851 A | 10/1998 | Blackmer | |
| 5,828,138 A | 10/1998 | McIver et al. | |
| 5,969,602 A | 10/1999 | Marks | |
| 6,020,814 A | 2/2000 | Robert | |
| 6,157,298 A | * 12/2000 | Garfinkel et al. | 340/479 |
| 6,249,219 B1 | 6/2001 | Perez et al. | |
| 6,249,232 B1 | * 6/2001 | Tamura et al. | 340/902 |
| 6,268,804 B1 | * 7/2001 | Janky et al. | 340/903 |
| 6,313,758 B1 | * 11/2001 | Kobayashi | 340/932 |
| 6,359,552 B1 | * 3/2002 | King | 340/436 |
| 6,397,133 B1 | * 5/2002 | van der Pol et al. | 701/37 |
| 2002/0105423 A1 | * 8/2002 | Rast | 340/479 |

* cited by examiner

*Primary Examiner*—Jeffery Hofsass
*Assistant Examiner*—Anne V. Lai
(74) *Attorney, Agent, or Firm*—Hahn Loeser & Parks LLP; Laura G. Barrow

(57) ABSTRACT

A vehicular warning system is disclosed that transmits information concerning a moving vehicle's rate of deceleration and magnetic orientation to surrounding vehicles carrying the warning system. Auditory and/or visual alerts are generated within surrounding vehicles carrying the inventive warning system to warn the driver therein of the rapidly decelerating vehicle ahead.

10 Claims, 4 Drawing Sheets

Process 1.

Vehicle Monitoring

EMERGENCY WARNING SYSTEM FOR VEHICLES

BACKGROUND AND SUMMARY OF THE INVENTION

As the highways become more crowded, especially during rush hours, the potential for multi-car accidents increases. Most of this can be attributed to drivers in vehicles not being able to adequately assess how fast the vehicles in front of them are braking. Braking warning devices have been described in the art that provide this capability by a variety of different mechanisms. The inventors' U.S. Pat. No. 6,249,219 (hereinafter the "'219 patent"), which is incorporated herein by reference in its entirety, is directed to a self-contained, severe braking warning system for vehicles that continuously measures a vehicle's rate of motion and, upon braking, affects the brake light circuit proportionately to the severity of deceleration, thereby allowing drivers of vehicles traveling directly behind more time to adjust their speed and/or steering to avoid a rear-end collision with the decelerating vehicle.

The present invention is directed, in part, to a vehicular warning system that transmits information concerning the vehicle's rate of deceleration and magnetic orientation to surrounding vehicles carrying the inventive warning system, regardless of whether the surrounding the vehicles are traveling directly behind the decelerating vehicle or in a location where the decelerating vehicle is not within the immediate view of the driver of the surrounding vehicle. This information is transmitted via radio frequency signals to other vehicles containing the inventive warning system, which also includes a transceiver and microprocessor configured to read such signals. An auditory or visual alert device is activated by the microprocessor of the warning system contained in the vehicle receiving the signals to warn the driver therein of the severe braking condition ahead.

The present invention may also be configured to receive signals from remote transmitters, such as transmitter beacons, installed at or near construction zones, school zones, accident zones, and the like, to warn drivers of surrounding vehicles carrying the inventive warning system of a potentially hazardous situation ahead. Such alert transmitters could similarly be installed on non-motorized vehicles, such as bicycles and child ride-on toys, for example. The transmitted signals would correspond to the presence of the remote transmitter. In addition, the signals could also correspond to the type of hazardous situation (e.g. construction zone or bicycle). The signals would trigger the inventive system's microprocessor to activate a visual or auditory alert device within the surrounding vehicle containing the inventive system such that the alert device conveys particular visual displays (e.g. flashing lights) or auditory tones corresponding the presence of the emergency of non-moving vehicle and/or to a particular emergency or potentially hazardous situation.

DETAILED DESCRIPTION OF PREFERRED EMBODIMENTS

Figure 1:
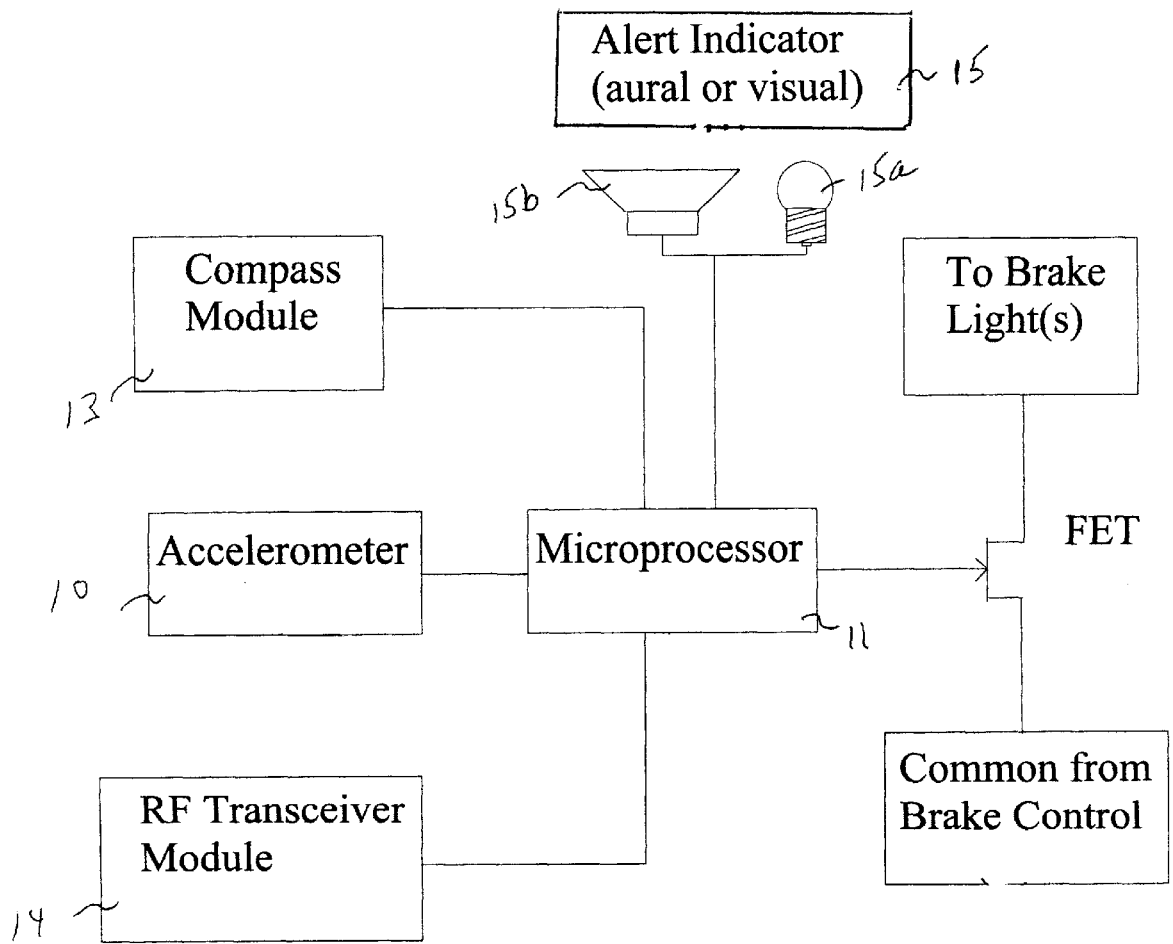
FIG. 1 is a schematic flow chart illustrating the primary component of one embodiment of the present invention.

The present invention, in certain embodiments, is directed to a braking warning system for installation in a motorized vehicle. Exemplary motorized vehicles include, but are not limited to, motorcycles, buses, automobiles, three-wheel all-terrain vehicles, vans, motor homes, sport utility vehicles, construction vehicles, trucks, and remote-controlled vehicles. The braking warning system installed in such vehicles comprises an accelerometer 10, preferably a MEMS accelerometer, that is programmed to transmit a varying output signal correlating to the deceleration forces exerted upon it by the moving vehicle. The warning system further comprises a microprocessor 11 electrically connected to the accelerometer. The microprocessor may be the existing microprocessor of the vehicle's control unit or an independent device. The microprocessor is programmed with software code for interpreting the accelerometer's output signal. This program allows the microprocessor to monitor the varying output signals transmitted from the accelerometer, calculate g-forces at any given time based upon the varying output signals, and create an output signal having a frequency based upon the deceleration forces detected by the accelerometer. The software is thus designed to achieve the highest accuracy and the highest repeatability of such measurements. The warning system further includes a compass module 13 electrically connected to the microprocessor 11. The compass module is configured to detect the magnetic orientation of the vehicle in which the system is installed and transmit to the microprocessor 11 an output signal corresponding to its magnetic orientation.

The compass module 13 may be one of any number of standard modules currently available on the market. Such devices are typically based on the magnetoresistive effect in which a magnetic material changes its resistance based on the presence of an external magnetic field. An exemplary module is a Phillips Semiconductor KMZ52, which is a 16-pin integrated circuit package with the primary signals illustrated in FIG. 2.

The compass module 13 uses two wheatstone bridges—one for X- and one for Y-field orientations, each comprising four magnetoresistive elements. Each bridge measures the earth's magnetic field angle based on its own internal orientation. The resulting signals (i.e. Vx and Vy) are fed into the inventive system's microprocessor's analog-to-digital converter (ADC) which performs the necessary calculations to determine the vehicle's orientation.

The inventive warning system further includes a radio frequency transceiver electrically connected to the microprocessor 11. The system also comprises an auditory or visual alert device 15. Depending upon whether the inventive warning system is installed in the rapidly decelerating vehicle or the surrounding vehicle(s), the respective transceivers, microprocessors, and alerting devices will perform different functions. Thus, for ease of explanation, these components of the inventive system will be described with respect to the decelerating motorized vehicle (hereinafter referred to as "DMV") and the surrounding motorized vehicles (hereinafter referred to as "SMV"), wherein preferably both vehicles contain the same inventive warning system or modifications thereof.

The Vehicle in Severe Deceleration

Figure 3:
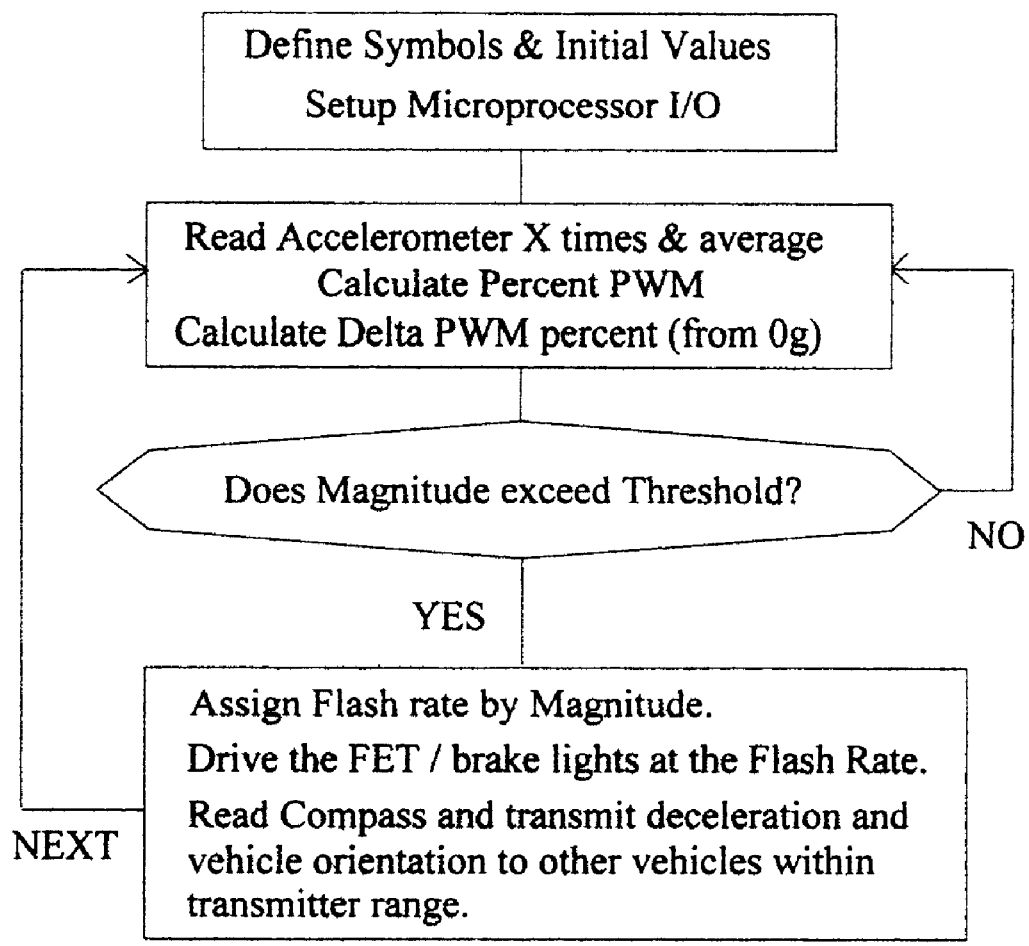
FIGS. 3 and 4 are flow charts illustrating the software processing of one embodiment of the present invention.

As illustrated in part by the flow chart in FIG. 3, when the DMV is in severe deceleration, the transceiver 14 of the DMV warning system is configured to transmit radio frequency signals to SMV's carrying the inventive warning system and within RF range of the DMV (i.e. between ½ and ¾ kilometers). These transmitted signals correspond to the deceleration forces exerted on the DMV as well as the magnetic orientation of the DMV, as discussed above, and function as a broadcasted alert to SMV's carrying the inventive system and traveling in the same direction and/or within the same general vicinity. An exemplary command message structure is as follows:

<Start of Message><Unit ID><Deceleration Level><Compass Heading><checksum><End of Message> (1 byte, optional) (4 bytes) (4 bytes, floating point) (2 bytes, integer) (2 bytes, CRC) (1 byte, optional) e.g.: 0x02 12115 −1.3 272 0xCDEF 0x03

Figure 2:
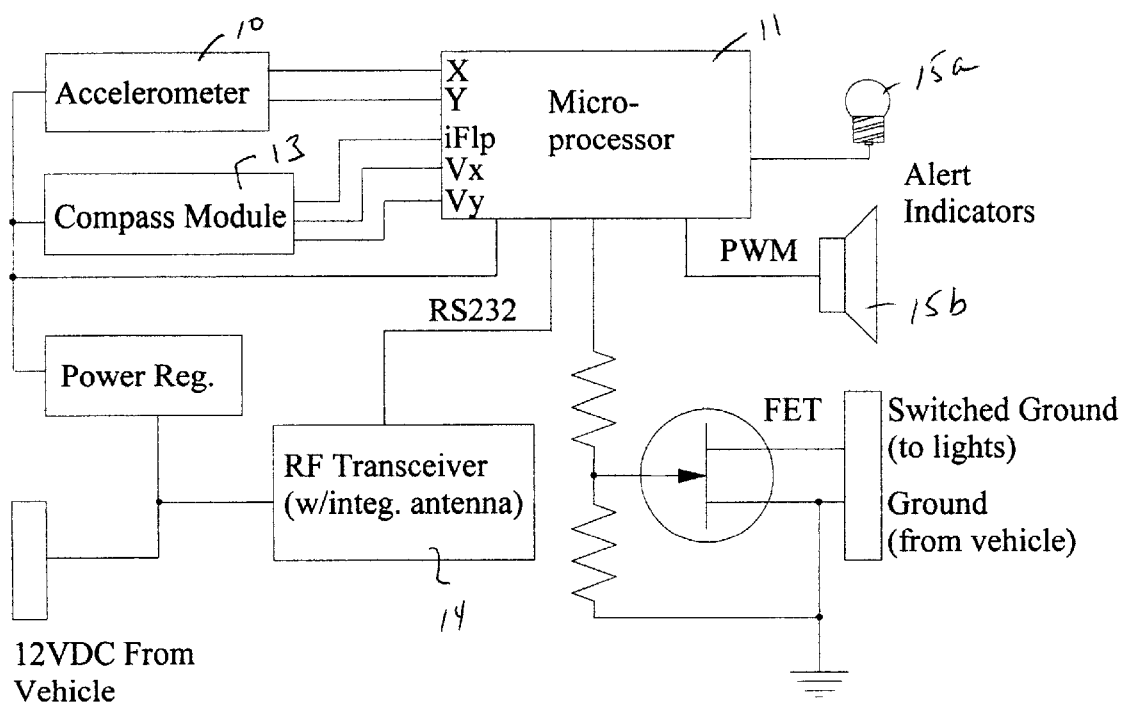
FIG. 2 is simplified electrical schematic of one embodiment of the present invention.

As shown in FIGS. 1 and 2, for example, the inventive warning system may also include features described in the inventors' '219 patent, namely, a switch, preferably a logic-actuated switch, that is electrically connected to the microprocessor and to the brake light circuit of the DMV, the brake light circuit further connected to the DMV's brake light indicators. The switch is configured to receive the output signal created by the microprocessor and to subsequently turn the brake light circuit on and off at a programmed rate correlative to the deceleration forces, thereby causing the brake light indicators to blink on and off at the programmed rate. As described in the '219 patent, the switch is most preferably connected to the brake light circuit such that the switch will not impede the normal functioning of the vehicle's brake light indicators during normal braking, or in the event the inventive warning system fails to operate properly or at all. Other variations of the invention described in the '219 patent may also be employed in the present invention without departing from the spirit of the present invention. As described in more detail below, the present invention provides, in certain aspects, broader capabilities than the invention described in the '219 patent, and consequently may omit these additional features described in the '219 patent. However, for simplicity purposes, the figures illustrate these optional features.

Surrounding Vehicles

Figure 4:
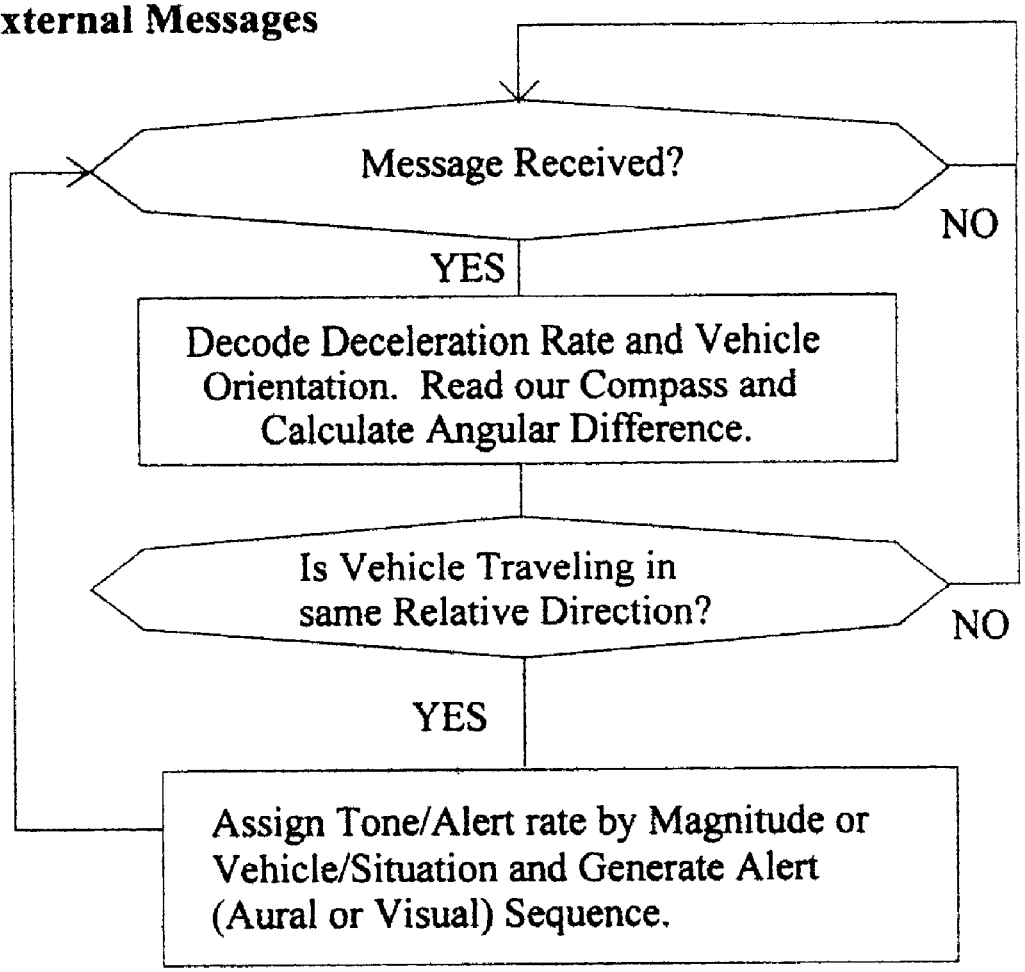

Once the transmitted DMV signals are broadcasted, the transceiver of the SMV inventive warning system picks up or receives these signals, which in turn are read by the SMV warning system's microprocessor, as shown in part by the flow chart in FIG. 4. The SMV microprocessor is programmed to compare the received DMV signals to the SMV's magnetic orientation to determine whether the SMV's orientation is within a pre-programmed angular range with respect to the DMV's orientation. [Note that the microprocessor of the SMV's warning system is programmed to read the SMV's orientation from the warning system's own compass module.] If the SMV is within the pre-programmed orientation with respect to the DMV, an alerting device (i.e. auditory or visual) 15 is activated to alert the driver of the SMV of the potentially hazardous situation he/she is approaching. For example, if a message is received from the DMV's warning system stating a deceleration of 1.8 g with an orientation of 272 degrees while the SMV's current compass reading is 231 degrees, the resulting angular difference between the two vehicles is 41 degrees. If the preprogrammed limit is 45 degrees, an alert is created by the alerting device to the driver of the SMV, thereby allowing the driver to take the necessary precautions (i.e. decelerate) to avoid an accident.

The alerting device may be visual, as provided by a flashing light 15a, for example, or it may be auditory 15b, as provided by a speaker capable of transmitting a series of tones. In both embodiments, the rate of flashing lights or auditory tone transmissions, for example, may vary depending upon the severity of the DMV deceleration. For example, when a speaker is provided for the auditory alert device, pre-defined tones are created as pulse width modulations (PWM) by the microprocessor and sent to the speaker at a rate indicative of the severity of the received alert.

As a safety precaution, the inventive system may be designed such that the SMV microprocessor will ignore transmitted alerts from DMV's when the SMV itself is experiencing a state of severe deceleration. The advantage of this feature is that added distractions created by the visual or auditory alert within the SMV's system are consequently eliminated, thereby allowing the SMV driver to concentrate on handling the vehicle and avoid an accident.

The microprocessor of the inventive warning system may also be programmed to read signals transmitted from a remote beacon transmitter (not shown) installed on a remote carrier, such as a non-motorized vehicle (e.g. bicycle or child's ride-on toy), an emergency vehicle (e.g. ambulance, fire truck, police vehicle), or a potentially hazardous site (e.g. off-road and on-road construction sites, school zones, hospital zones, accident sites, etc.). The beacon transmitter is designed to transmit signals employing the same message structure employed between the warning systems installed on DMV's and SMV's described above. Additionally, such signals would be broadcasted on the same frequency band as the transceiver 14 of the inventive warning system installed on the motorized vehicles. The transmitted signals from the remote transmitter would correspond to the presence or location of the transmitter (through range limiting of the beacon) as well as the type of potentially hazardous situation (i.e. a bicycle versus a road construction zone) by use of the UnitID message segment to designate the type of alert condition. The inventive warning system's microprocessor would then activate the alerting device 15 to warn the vehicle's driver of the presence and/or type of potential danger ahead. The alert generated by the alerting device, in turn, would correspond to the particular potentially hazardous situation. Moreover, the type of alert generated could be different from the alert generated in response to a DMV described above.

In some applications, it may be further desired that the transmitter beacon power be low enough such that it provides a range restricted to the type and location of the condition. This feature is particularly desirable when the vehicle is traveling in a residential area, wherein without such a feature, the driver would likely be distracted by a barrage of alerts corresponding to bicycles in the area.

We claim:

1. A severe braking warning system comprising
   a. an accelerometer programmed to measure deceleration forces exerted on it by a moving first vehicle in which said system is installed and to transmit varying output signals correlating to said deceleration forces;
   b. a microprocessor electrically connected to said accelerometer, said microprocessor programmed to monitor said varying output signals from said accelerometer;
   c. a compass module electrically connected to said microprocessor and configured to detect a magnetic orientation of said first vehicle and transmit to said microprocessor an output signal corresponding to said magnetic orientation;
   d. a radio frequency transceiver electrically connected to said microprocessor, said transceiver designed to transmit radio frequency signals to a second transceiver of a second braking warning system upon activation by said microprocessor, said transmitted radio frequency signals corresponding to said deceleration forces exerted on said first vehicle and corresponding to said magnetic orientation of said first vehicle;

e. said radio frequency transceiver further designed to receive radio frequency signals from a severe braking warning system installed in a second vehicle, said received radio frequency signals corresponding to a deceleration level and magnetic orientation of said second vehicle;

f. an alerting device electrically connected to said microprocessor, said alerting device is configured to convey visual or auditory alerts within said first vehicle upon activation by said microprocessor;

g. said microprocessor programmed to compare said received signals from said transceiver to said first vehicle's magnetic orientation to determine whether said second vehicle's orientation is within a pre-programmed angular range with respect to said first vehicle's orientation, whereby when said second vehicle is within said angular range, said microprocessor is programmed to activate said aural indicator to transmit said auditory alerts within said first vehicle; and h. said microprocessor is further programmed to ignore said received signals from said transceiver when said first vehicle is traveling at a deceleration rate corresponding to a pre-programmed deceleration rate value.

2. The system of claim 1, wherein said first and second vehicles are motorized vehicles.

3. The system of claim 2, wherein said motorized vehicles are selected from the group of motorcycles, automobiles, three-wheel all-terrain vehicles, buses, vans, motor homes, sport utility vehicles, construction vehicles, trucks, and remote-controlled vehicles.

4. A warning system comprising:

a. an accelerometer programmed to measure deceleration forces exerted on it by a moving vehicle in which said system is installed and to transmit varying output signals correlating to said deceleration forces;

b. a microprocessor electrically connected to said accelerometer, said microprocessor programmed to monitor said varying output signals from said accelerometer;

c. a compass module electrically connected to said microprocessor and configured to detect a magnetic orientation of said vehicle and transmit to said microprocessor an output signal corresponding to said magnetic orientation;

d. a radio frequency transceiver electrically connected to said microprocessor, said transceiver designed to transmit radio frequency signals to a second transceiver of a second braking warning system, said transmitted radio frequency signals corresponding to said deceleration forces exerted on said vehicle and corresponding to said magnetic orientation of said first vehicle;

e. said radio frequency transceiver further designed to receive radio frequency signals from a remote transmitter capable of sending messages understood by said warning system, said messages corresponding to messages selected from presence, location, and type of hazardous situation;

f. an alerting device electrically connected to said microprocessor, said alerting device configured to transmit visual or auditory alerts within said vehicle upon activation by said microprocessor; and g. said microprocessor is further programmed to ignore said received signals from said transceiver when said first vehicle is traveling at a deceleration rate corresponding to a pre-programmed deceleration rate value.

5. The system of claim 4, wherein said remote transmitter is installed on a non-motorized vehicle.

6. The system of claim 5, wherein said non-motorized vehicle is selected from the group of bicycles, tricycles, scooters, skateboards, skates, wagons, and ride-on toys.

7. The system of claim 4, wherein said remote transmitter is installed at or near a potentially hazardous area.

8. The system of claim 7, wherein said area is selected from the group of on-road construction sites, off-road constructions sites, school zones, hospital zones, and accident sites.

9. The system of claim 4, wherein said remote transmitter is installed on an emergency vehicle.

10. The system of claim 4, wherein said alerts generated correspond to a type of potential hazard where or near where said remote transmitter is installed.

* * * * *